May 14, 1974  P. H. BOHITE ET AL  3,810,802
OPTICAL FIBER SPLICING DEVICE AND TECHNIQUE
Filed March 31, 1972
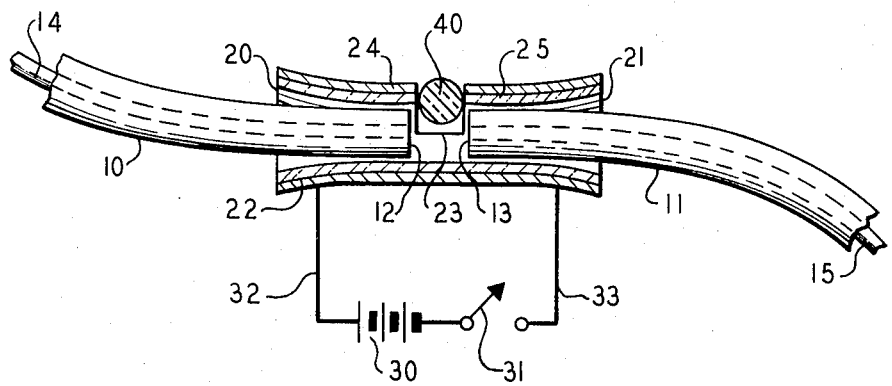

United States Patent Office 3,810,802
Patented May 14, 1974

3,810,802
OPTICAL FIBER SPLICING DEVICE AND TECHNIQUE
Paul Harold Buhite, Millington, and Douglas Arthur Pinnow, Berkeley Heights, N.J., assignors to Bell Telephone Laboratories, Incorporated, Murray Hill, N.J.
Filed Mar. 31, 1972, Ser. No. 240,204
Int. Cl. B65h 69/02
U.S. Cl. 156—158
6 Claims

ABSTRACT OF THE DISCLOSURE

A method and an apparatus are described for joining together single optical fibers under adverse environmental conditions. The fibers are aligned collinearly in a hollow sleeve, a quantity of low melting point transparent thermoplastic is inserted in the sleeve at the junction of the two fibers and heat is applied to melt the thermoplastic causing it to flow around the aligned ends thereby producing an optically efficient bond when the heat source is removed.

BACKGROUND OF THE INVENTION

(1) Field of the invention

This invention relates to optical transmission systems and, in particular, to methods and apparatus for splicing light transmitting fibers.

(2) Description of the prior art

Optical fibers appear to have several attractive features when compared with coaxial cables and millimeter waveguides as media for the transmission of broadband communication signals. Some of these features include: small size, high circuit capacity, growth capability and economy, and, due to the nonconductive nature of the fibers, lightning protection is unnecessary.

If optical communications systems utilizing these features advantageously are to become a commercial reality, it will be necessary to splice such fibers repeatedly and rapidly under adverse environmental conditions. Such conditions might be exemplified by those prevailing in a field operating environment where extreme variations of temperature, humidity and cleanliness are commonplace. Satisfactory operation under such conditions can only be achieved by maintaining a high degree of transmission efficiency through the joint.

Previously, fiber splicing was accomplished by applying a chemically set transparent glue to the fiber ends, clamping the ends together in a fixed alignment and allowing the glue to chemically cure. Typically, the curing process takes several hours. Another method, which is limited to the bonding of low melting point fibers, utilizes this temperature dependent characteristic by aligning the fibers in a vertical plane with a slight space between the ends, and by heating the fiber ends until expansion, captivation and fusion occur. Both of these methods utilize precision micropositioners to align the fiber ends prior to bonding, and the operator monitors the work through a microscope. Also, some degree of surface preparation of each of the fiber ends is required. This is extremely important in the latter technique where the presence of any protruding lips on the ends of the fibers will result in a highly inefficient bond being formed. These end surface irregularities are normally detected under a microscope and must be removed prior to the bonding operation. Consequently, these techniques are not suitable for the rapid splicing of optical fibers in an adverse environment. Once splices using either of the above procedures are complete, it is extremely difficult to reopen the joint to correct operator mistakes.

Accordingly, one object of the present invention is to eliminate the need for precision alignment equipment.

Another object is to overcome the difficulties presented by adverse environmental conditions to previous optical fiber splicing techniques.

A further object is to provide for easy and rapid reopening of the joint.

A still further object is to reduce the amount of time required to effect an optically efficient bond.

A still further object is to provide a technique for splicing optical fibers regardless of the melting point of the fiber material.

SUMMARY OF THE INVENTION

The foregoing and other objects of the invention are realized in an illustrative embodiment wherein the first and second fibers to be spliced are aligned by inserting them into opposite ends of a hollow, electric current conductive sleeve. A small quantity of a transparent thermoplastic is inserted in the sleeve at the junction of the fiber ends. This material has a melting point which is substantially lower than the melting point of inorganic glass fibers. The sleeve is heated by means of an electric current which causes the thermoplastic to become molten and flow around the adjacent fiber ends whereupon the electric current is removed and the joint allowed to cool. The sleeve is allowed to remain in place adding mechanical reinforcement to the joint.

It is one feature of the invention that the adjacent fiber ends are aligned collinearly in a hollow sleeve having an inside diameter only slightly larger than the outside diameter of the fibers.

A feature of one embodiment of the invention is that the sleeve is made of electrically conductive material and includes flared ends to facilitate fiber insertions and a transverse aperture at a point along its length for insertion of the low melting point thermoplastic.

A feature of a further embodiment of the invention is that the sleeve is made of dielectric material with an electrically conductive coating deposited on its outer surface.

BRIEF DESCRIPTION OF THE DRAWING

A more complete understanding of the invention may be derived from a consideration of the following detailed description and the appended claims taken in conjunction with the accompanying drawing which shows the apparatus for splicing optical fibers in accordance with the present invention.

DETAILED DESCRIPTION

Referring to the drawing, fibers 10 and 11 to be joined are inserted into opposite ends 20 and 21 of sleeve 22 until fiber ends 12 and 13 are adjacent to one another. The ends 20 and 21 of sleeve 22 are slightly flared to facilitate insertion of fibers 10 and 11. The inside diameter of the central portion of sleeve 22 is only slightly larger than the outside diameter of fibers 10 and 11, thereby ensuring that light transmitting cores 14 and 15 of fibers 10 and 11 are aligned collinearly. At a point along the length of sleeve 22 is a transverse aperture 23.

Bead 40 is inserted into aperture 23. Bead 40 is comprised of a transparent thermoplastic having an index of refraction which closely approximates that of fibers 10 and 11, and having a melting point substantially lower than the melting point of fibers 10 and 11. An example of a transparent thermoplastic exhibiting these properties is polymethylmethacrylate. This material has a melting point between 160 and 200 degrees centigrade which is substantially lower than the melting point of fibers 10 and 11 which typically ranges from 600 degrees C. to 2,000 degrees C.

After bead 40 is in place, electric current source 30 and control switch 31 in series with it are connected to sleeve 22 through circuits 32 and 33 which terminate with spring clips (not shown). This connection completes the series loop. Switch 31 is closed and current flows along the length of sleeve 22 resistively heating it. The heat generated in sleeve 22 is conductively coupled to fibers 10 and 11 and bead 40. In a few seconds bead 40 softens and melts, flowing between the aligned adjacent fiber ends 12 and 13. It is not necessary that fiber ends 12 and 13 become molten. At this point switch 31 is opened and current source 30, switch 31 and circuits 32 and 33 are removed. The assembly is then allowed to cool, the thermoplastic sets, and the bond is complete. Because of the small diameter of sleeve 22, cooling takes only a few seconds.

Alignment sleeve 22 remains in place adding mechanical support to the joint. The overall optical loss for splices made using the above method to join 0.003 inch diameter fibers is typically ½ db.

Since the thermoplastic in its molten state flows around and over fiber ends 12 and 13, and fills the space between fibers 10 and 11, it is unnecessary to perform any elaborate surface preparation on the ends prior to insertion in sleeve 22. The only requirement is that fiber ends 12 and 13 be clean and nominally flat. This criterion can be satisfied by a simple rebreaking of each of fiber ends 12 and 13. Therefore, a detailed inspection of fiber ends 12 and 13 for the presence of protruding lips can be dispensed with, along with the associated equipment required to make such an inspection. The elimination of the need for such equipment, when coupled with the elimination of precision fiber alignment equipment and monitoring microscope and the almost instantaneous setting time of the transparent thermoplastic, results in the technique being readily utilized in adhesive environmental conditions. In addition, if the need arises to reopen the joint, this can be simply accomplished by reconnecting circuits 32 and 33 to sleeve 22 and initiating current flow by closing switch 31. The thermoplastic will remelt and either one or both fiber ends 10 and 11 can be removed. Making and opening the joint can be repeated an unlimited number of times.

In one embodiment of the invention sleeve 22 is made of electrically conductive material, e.g., brass. In the preferred embodiment sleeve 22 is made of a dielectric material with an electrically conductive coating 24 deposited on outer surface 25 of sleeve 22.

Capillary tubes have been found to be quite suitable in this application. The inside surfaces of these tubes are somewhat smoother than that obtainable with a comparable metallic tube. Consequently, tighter tolerance on the alignment of fiber ends 12 and 13 can be achieved. Flared ends 20 and 21 on sleeve 22 are produced by locally heating a capillary tube which is much longer than sleeve 22, blowing air into the tube to create a small bubble in the material, repeating the process at a point further along the tube, and then scoring and breaking the tube at the points where the bubble diameters are a maximum. The transverse aperture is produced by sandblasting an opening at a point along one side of the tube.

Several methods may be used to put the electrical conductive coating on outer surface 25 of sleeve 22. One such method is vacuum depositing a layer of chrome-gold on surface 25. Another is sputtering a coating of conducting but transparent indium oxide on surface 25.

In all cases it is understood that the above described embodiments are illustrative of but a small number of the many possible specific embodiments which can represent applications of the principles of the invention. Thus, numerous and varied other arrangements can readily be devised in accordance with these principles by those skilled in the art without departing from the spirit and scope of the invention.

What is claimed is:

1. A combination for splicing optical fibers which comprises
   first and second fibers having adjacent ends,
   a sleeve for aligning said adjacent fiber ends collinearly, said sleeve being comprised of electrical conductive material, and
   means for bonding said collinear adjacent fiber ends.

2. A combination for splicing optical fibers which comprises
   first and second fibers having adjacent ends,
   a sleeve for aligning said adjacent fiber ends collinearly, said sleeve being comprised of
      dielectric material,
      an electrical conductive coating deposited on the outer surface, and
   means for bonding said collinear adjacent fiber ends.

3. A combination for splicing optical fibers which comprises
   first and second fibers having adjacent ends,
   a sleeve for aligning said adjacent fiber ends collinearly, and
   means for bonding said collinear adjacent fiber ends including
      a transparent thermoplastic having a melting point substantially lower than the melting point of said fibers and said thermoplastic having an index of refraction which closely approximates that of said fibers, and
      means for applying heat to melt said thermoplastic.

4. The combination in accordance with claim 3 wherein the transparent thermoplastic is comprised of polymethylmethacrylate.

5. The combination in accordance with claim 3 wherein the means for applying heat to melt the transparent thermoplastic comprises
   a source of electric current,
   means for controlling the flow of said current in electrical series with said source,
   means for connecting said sleeve in a series loop with said source and said control means.

6. A method for splicing optical fibers comprising the steps of
   inserting first and second fibers and a bead of transparent thermoplastic into an alignment sleeve,
   heating said assembly to a temperature above the melting point of said thermoplastic but below the melting point of said fibers, and
   terminating said applied heat.

References Cited
UNITED STATES PATENTS

| | | | |
|---|---|---|---|
| 3,455,625 | 7/1969 | Brumley et al. | 350—96 |
| 2,813,818 | 11/1957 | Pearson | 156—294 X |
| 3,734,594 | 5/1973 | Trambarulo | 350—96 |

WILLIAM A. POWELL, Primary Examiner

U.S. Cl. X.R.

156—296, 304, 502; 350—96